UNITED STATES PATENT OFFICE.

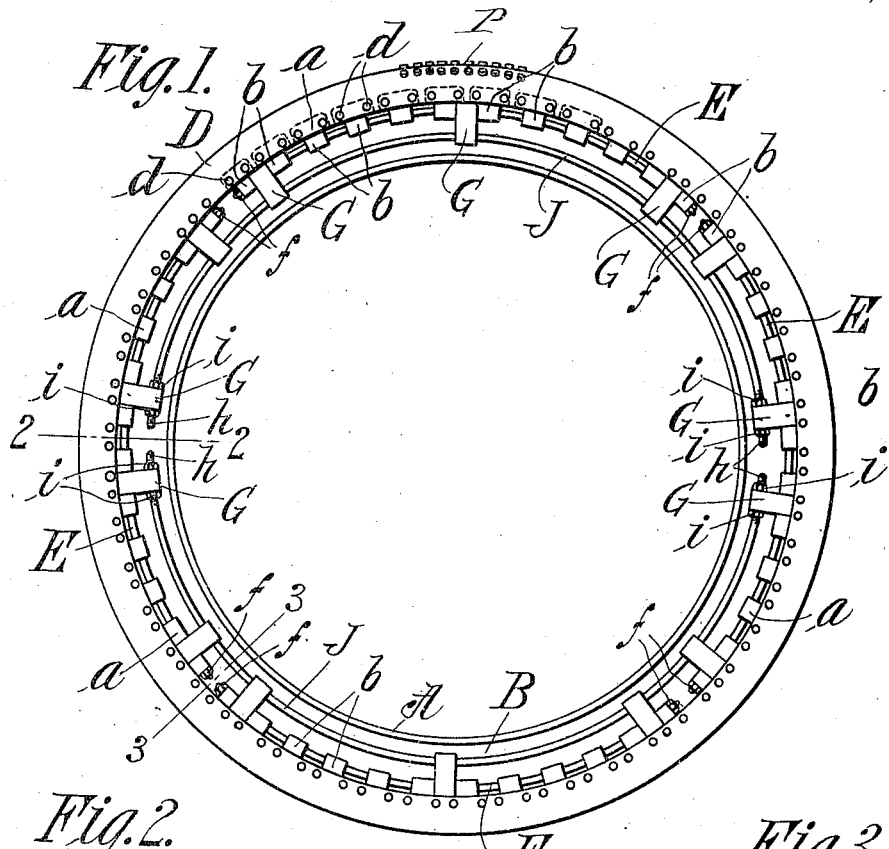
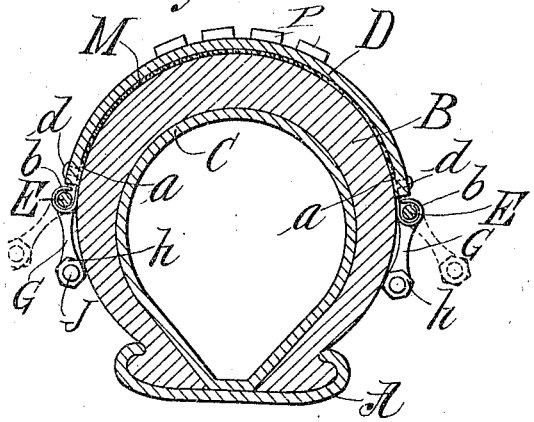
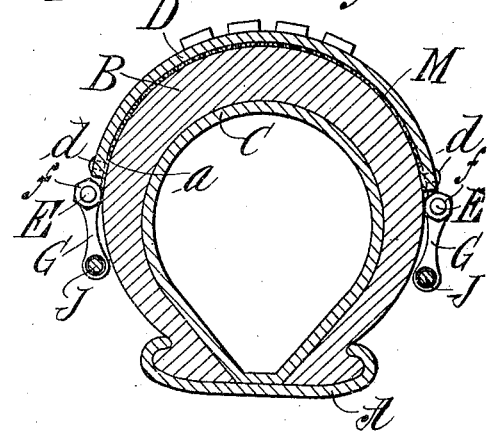

LEWIS J. TETLOW, OF WEST SPRINGFIELD, MASSACHUSETTS.

PROTECTIVE COVERING FOR PNEUMATIC-TIRED WHEELS.

1,030,348.      Specification of Letters Patent.      Patented June 25, 1912.

Application filed July 14, 1911. Serial No. 638,517.

*To all whom it may concern:*

Be it known that I, LEWIS J. TETLOW, a citizen of the United States of America, and resident of West Springfield, in the county of Hampden and State of Massachusetts, have invented certain new and useful Improvements in Protective Coverings for Pneumatic-Tired Wheels, of which the following is a full, clear, and exact description.

This invention relates to protective coverings for pneumatic tired wheels and has for its object to provide an outer protective covering to encircle and inclose the usual shoe or tire case with, combined therewith, means for the secure retention of the protective covering in its relation to the tire, which means is susceptible of permitting both quick and easy application and removal.

The invention is described in conjunction with the accompanying drawings and set forth in the claims.

In the drawings:—Figure 1 is a side view of a tire and wheel rim with my protective covering and its fastening means in place thereon. Fig. 2 is a cross sectional view on line 2—2, Fig. 1; Fig. 3 is a cross sectional view on line 3—3, Fig. 1.

In the drawings, A represents a rim of a clencher type engaged with which is the outer shoe or tire case B, the edge of which incloses and holds in place the inner pneumatic tube C.

D represents the protective tire covering which is of annular form and of proper dimension to circumferentially inclose the tire, and is cross sectionally of approximately a partially circular form. This tire covering has at its opposite edge portions a plurality of eye lugs, a comparatively large number of these being distributed in proper separations throughout the entire circular extent of each edge portion of the tire covering. Of these eye lugs $b$ represents eye members, and $a$ represents flat plate like attachment portions, these being secured to the protector D by being overlapped internally of the marginal portions of the protector and secured by rivets $d$. Curved rods E E are engaged through the eye lugs which have their positions slightly inwardly beyond the edges of the annular tire protector D and they have nuts $f$ screw engaged on their protruding ends so that the rods are tightly locked in their relations shown and become to all intents and purposes integral with the ear lugs. A series of links G are pivotally hung to the curved rods and inwardly extended therefrom. These links are held against circumferential displacement by being engaged between pairs of the eye lugs.

J J represent a plurality of curved rods engaged through the inner extremities of the links; and these rods have their end portions which are extended through and adjacent the links made with screw threads $h$ on which nuts $i$ are screw engaged, which nuts are adapted to be set against the opposite faces of the links.

When the nuts $i$ $i$ are loosened relatively to the ear lugs adjacent which they are applied, the curved rods J J and the links therewith may be swung from the curved rods E which form their fulcrums to the open position indicated by the dotted lines in Fig. 2 so that the protective covering is easily applied in its place about the tire or removed therefrom. When the protective covering is in its place the curved rods are swung upon the links to their inward positions of bearing against the flanks of the tire shoe and retained against displacement outwardly from such position by the tightening up of the nuts $i$ $i$ against opposite edges of the links. This securing of the link carried curved rods J J in their inward positions, as shown by the full lines in Figs. 2 and 3, may be most effectively and reliably done by the simple provision of the nuts $i$. An explanation in this connection is here given as follows: The links are practicably the same as members which are hinged on the rods $b$, and when they are bodily swung outwardly to carry the confining curved rods J J with them there is necessarily a degree of oscillation between the outer extremities of the links and such rods J J; and if such oscillation is prevented the links will be bound against their swinging movements and there can be no outward carrying by them of the curved rods. Therefore, by setting the nuts $i$ $i$, which are carried in screw engagement on the rods in clamping engagement against the opposite edges of the links, the whole annular cage-like structure is so held with its opposite retaining parts in confinement as to render a loosening or detachment from the tired wheel an impossibility.

I claim:—

1. An annular protective tire covering having links pivotally connected with and inwardly extending from the inner edges thereof, curved rods engaged through the links, and having nuts screw threading thereon at opposite sides of the links and detachably binding against the latter, whereby oscillatory movement relatively between the links and curved rods is prevented.

2. A protecting tire covering having eye members extending inwardly beyond its opposite edges, curved rods engaged through the eye members and having links engaged thereon, other curved rods engaged through the links and having pairs of nuts screw threading thereon at opposite sides of the links and binding against the latter, said second named curved rods being adapted to have confined positions against the opposite flank portions of the tire.

3. An annular protective tire covering having a series of plates made with eye-lugs riveted to the inner edge portions thereof, the eye-lug portions extending inwardly from such edge portions, curved rods extending through the eye-lugs and having nuts screw engaged on the ends thereof and in confinement against the eye-lugs which are adjacent thereto, a plurality of links pivotally hung to the curved rods and inwardly extended therefrom, and held against displacement between pairs of the eye-lugs, other curved rods engaged through the inner extremities of the links, and having the end portions thereof which are extended through the links which are adjacent thereto screw threaded, and having nuts engaged thereon and adapted to be set against the opposite faces of the links.

Signed by me at Springfield, Mass., in presence of two subscribing witnesses.

LEWIS J. TETLOW.

Witnesses:
 WM. S. BELLOWS,
 G. R. DRISCOLL.